(12) United States Patent
Wierzynski et al.

(10) Patent No.: US 11,507,699 B2
(45) Date of Patent: Nov. 22, 2022

(54) PROCESSOR WITH PRIVATE PIPELINE

(71) Applicant: Intel Corporation, Santa Clara, CA (US)

(72) Inventors: Casimir Wierzynski, La Jolla, CA (US); Fabian Boemer, San Diego, CA (US); Rosario Cammarota, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 16/585,856

(22) Filed: Sep. 27, 2019

(65) Prior Publication Data

US 2021/0097206 A1     Apr. 1, 2021

(51) Int. Cl.
G06F 21/72       (2013.01)
G06F 7/58        (2006.01)
H04L 9/08        (2006.01)

(52) U.S. Cl.
CPC .............. G06F 21/72 (2013.01); G06F 7/588 (2013.01); H04L 9/08 (2013.01); *H04L 2209/04* (2013.01); *H04L 2209/125* (2013.01)

(58) Field of Classification Search
CPC ........ G06F 21/602; G06F 21/72; G06F 7/588; G06F 2212/402; G06F 12/1408; G06F 2221/2107; G06F 9/3867; H04L 9/0637; H04L 9/002; H04L 9/0894; H04L 9/003; H04L 9/0643; H04L 9/14; H04L 9/0662; H04L 9/0861; H04L 9/08; H04L 9/0625; H04L 9/0618; H04L 9/065; H04L 9/0631; H04L 2209/04; H04L 2209/08; H04L 2209/125; H04L 2209/24; H04L 2209/046; H04L 2209/12
See application file for complete search history.

(56) References Cited

U.S. PATENT DOCUMENTS

| | | | | |
|---|---|---|---|---|
| 5,870,470 | A * | 2/1999 | Johnson ................ | H04L 9/0618 380/282 |
| 7,822,207 | B2 * | 10/2010 | Douguet ................ | H04L 9/004 713/192 |
| 8,369,516 | B2 * | 2/2013 | Itoh ........................ | H04L 9/003 380/28 |
| 8,422,668 | B1 * | 4/2013 | Thichina .................. | G06F 7/76 714/755 |
| 8,577,025 | B2 * | 11/2013 | Fumaroli .............. | G06F 21/755 380/28 |
| 9,871,652 | B2 * | 1/2018 | Morikawa ................ | G09C 1/00 |

(Continued)

OTHER PUBLICATIONS

Extended European Search Report and Search Opinion, EP App. No. 20181986.9, dated Nov. 26, 2020, 10 pages.

(Continued)

*Primary Examiner* — David Garcia Cervetti
(74) *Attorney, Agent, or Firm* — Nicholson De Vos Webster & Elliott LLP

(57) ABSTRACT

An example private processing pipeline may include: a masked decryption unit to perform a masked decryption operation transforming input data into masked decrypted data; a masked functional unit to produce a masked result by performing a masked operation on the masked decrypted data; and a masked encryption unit to perform a masked encryption operation transforming the masked result into an encrypted result.

16 Claims, 14 Drawing Sheets

(56) References Cited

U.S. PATENT DOCUMENTS

| | | | |
|---|---|---|---|
| 10,235,335 B1* | 3/2019 | Speers | G06F 16/2425 |
| 10,735,179 B2* | 8/2020 | Nguyen | H04L 9/008 |
| 2002/0114451 A1* | 8/2002 | Satterfield | H04L 9/0618 380/37 |
| 2003/0048903 A1* | 3/2003 | Ito | H04L 9/003 380/263 |
| 2005/0147243 A1* | 7/2005 | Baek | G06F 7/00 380/28 |
| 2005/0207571 A1* | 9/2005 | Ahn | H04L 9/003 380/28 |
| 2005/0232430 A1* | 10/2005 | Gebotys | H04L 9/003 380/286 |
| 2005/0283714 A1* | 12/2005 | Korkishko | G06F 7/724 714/781 |
| 2006/0120527 A1* | 6/2006 | Baek | G06F 7/726 380/252 |
| 2006/0256963 A1* | 11/2006 | Gebotys | H04L 9/003 380/205 |
| 2007/0140478 A1* | 6/2007 | Komano | H04L 9/0618 380/28 |
| 2007/0189543 A1* | 8/2007 | Gammel | H04L 9/12 380/286 |
| 2007/0211890 A1* | 9/2007 | Gebotys | H04L 9/003 380/28 |
| 2008/0019503 A1* | 1/2008 | Dupaquis | H04L 9/002 380/28 |
| 2008/0253557 A1* | 10/2008 | Dottax | H04L 9/002 380/28 |
| 2008/0260145 A1* | 10/2008 | Trichina | H04L 9/003 380/46 |
| 2009/0112896 A1* | 4/2009 | Golic | H04L 9/003 |
| 2009/0116644 A1* | 5/2009 | Klimov | H04L 9/0625 380/252 |
| 2009/0281974 A1* | 11/2009 | Saxena | G06N 3/0427 706/14 |
| 2010/0086126 A1* | 4/2010 | Yokota | H04L 9/003 708/250 |
| 2010/0205189 A1* | 8/2010 | Ebrahimi | G06F 21/62 707/804 |
| 2010/0257373 A1* | 10/2010 | Motoyama | G06F 21/755 713/189 |
| 2011/0013767 A1* | 1/2011 | Kim | H04L 9/0618 380/28 |
| 2011/0013769 A1* | 1/2011 | Itoh | H04L 9/003 380/28 |
| 2011/0044450 A1* | 2/2011 | Choi | H04L 9/003 380/28 |
| 2011/0055591 A1* | 3/2011 | Rivain | H04L 9/003 713/189 |
| 2011/0085662 A1* | 4/2011 | Myers | H03K 19/17728 380/252 |
| 2011/0113050 A1* | 5/2011 | Youn | G06F 21/6218 707/E17.124 |
| 2011/0261958 A1* | 10/2011 | Gebotys | H04L 9/003 380/252 |
| 2011/0268266 A1* | 11/2011 | Fujisaki | H04L 9/003 380/28 |
| 2012/0047417 A1* | 2/2012 | Koike | H04L 9/005 714/E11.044 |
| 2012/0163585 A1* | 6/2012 | Choi | H04L 9/002 380/28 |
| 2012/0250854 A1* | 10/2012 | Danger | H04L 9/003 380/28 |
| 2012/0294439 A1* | 11/2012 | Choi | G06F 21/755 380/28 |
| 2013/0077790 A1* | 3/2013 | Kawabata | H04L 9/0631 380/28 |
| 2013/0236005 A1* | 9/2013 | Ikeda | H04L 9/003 380/28 |
| 2014/0164785 A1* | 6/2014 | Ochiai | H04L 9/0816 713/189 |
| 2014/0169553 A1* | 6/2014 | Chen | G06F 7/726 380/28 |
| 2014/0211937 A1* | 7/2014 | Coric | H04L 9/0869 380/28 |
| 2015/0082435 A1* | 3/2015 | Roussellet | G06F 21/64 726/23 |
| 2015/0082449 A1* | 3/2015 | Mushkatblat | G06F 21/6254 726/26 |
| 2015/0169540 A1* | 6/2015 | Saxena | G06F 16/93 707/755 |
| 2015/0244524 A1* | 8/2015 | Pulkus | G06F 16/2282 380/28 |
| 2015/0278553 A1* | 10/2015 | Matsuda | G06F 21/72 713/192 |
| 2016/0012238 A1 | 1/2016 | Ioannidis et al. | |
| 2016/0127123 A1* | 5/2016 | Johnson | H04L 9/003 713/189 |
| 2016/0154746 A1* | 6/2016 | Cooke | G06F 12/0811 711/123 |
| 2016/0277180 A1* | 9/2016 | Wang | H04L 9/003 |
| 2016/0379014 A1* | 12/2016 | Satpathy | G09C 1/00 713/189 |
| 2017/0063522 A1* | 3/2017 | Bruneau | H04L 9/0631 |
| 2017/0195117 A1* | 7/2017 | Wu | H04L 9/14 |
| 2017/0230171 A1* | 8/2017 | Gadepally | H04L 9/14 |
| 2017/0244553 A1 | 8/2017 | Savry et al. | |
| 2017/0293765 A1* | 10/2017 | Kang | G06F 21/602 |
| 2017/0295010 A1* | 10/2017 | Shibutani | G09C 1/00 |
| 2017/0323119 A1* | 11/2017 | Harp | G06F 3/065 |
| 2017/0357484 A1* | 12/2017 | Dyka | G06F 7/5324 |
| 2017/0373838 A1* | 12/2017 | Wurcker | H04L 9/002 |
| 2018/0018147 A1* | 1/2018 | Sugawara | G06F 17/16 |
| 2018/0062263 A1* | 3/2018 | Cioranesco | H04L 9/0618 |
| 2018/0062830 A1* | 3/2018 | Baker | G06F 21/602 |
| 2018/0083769 A1* | 3/2018 | Maghrebi | H04L 9/002 |
| 2018/0097618 A1* | 4/2018 | Kumar | H04L 9/003 |
| 2018/0167196 A1* | 6/2018 | Cooper | G06F 21/72 |
| 2018/0174493 A1* | 6/2018 | Ohori | H04L 9/0866 |
| 2018/0183576 A1* | 6/2018 | Wang | H04L 9/0631 |
| 2018/0218166 A1* | 8/2018 | Cachin | G06F 21/6254 |
| 2018/0351729 A1* | 12/2018 | Tunstall | G06F 21/71 |
| 2018/0367297 A1* | 12/2018 | Bauer | H04L 9/0625 |
| 2019/0050204 A1* | 2/2019 | Hutter | G06F 7/588 |
| 2019/0272384 A1* | 9/2019 | Kawabata | G06F 16/00 |
| 2019/0349187 A1* | 11/2019 | do Canto | H04L 9/003 |
| 2019/0377895 A1* | 12/2019 | Sanghi | G06F 21/6254 |
| 2020/0034573 A1* | 1/2020 | Pulkus | G06F 21/755 |
| 2020/0322127 A1* | 10/2020 | Lozac'H | H04L 9/003 |
| 2020/0372394 A1* | 11/2020 | Kulkarni | G06N 5/02 |
| 2020/0389303 A1* | 12/2020 | Kim | H04L 63/0861 |
| 2021/0058228 A1* | 2/2021 | Cioranesco | H04L 9/002 |
| 2021/0064779 A1* | 3/2021 | Krishnan | H04L 9/30 |
| 2021/0157586 A1* | 5/2021 | Vigilant | H04L 9/002 |
| 2021/0165633 A1* | 6/2021 | Guilley | G06F 7/501 |
| 2021/0266143 A1* | 8/2021 | Boue | H04L 9/0637 |
| 2021/0406406 A1* | 12/2021 | Hutter | G06F 7/575 |

OTHER PUBLICATIONS

Kim et al., "Encrypting Controller using Fully Homomorphic Encryption for Security of Cyber-Physical Systems", IFAC—PapersOnLine, vol. 49, No. 22, 2016, 6 pages.

Breuer, Peter, "A First Practical Fully Homomorphic Crypto-Processor Design", https://arxiv.org/pdf/1510.05278.pdf, 6 pages, Mar. 2, 2016.

Xu, Chen, "Homomorphically Encrypted Arithmetic Operations over the Integer Ring", https://eprint.iacr.org/2017/387.pdf, 14 pages, [retrieved from the internet: Jan. 17, 2020].

Xie, Pengtao, et al., Under review as a conference paper at ICLR 2015, "Crypto-Nets: Neural Networks over En-Crypted Data", https://arxiv.org/pdf/1412.6181.pdf—Dec. 24, 2014, 9 pages.

Moradi, Amir, et al., "Pushing the Limits: A Very Compact and a Threshold Implementation of AES", https://www.iacr.org/archive/eurocrypt2011/66320067/66320067.pdf—May 15, 2011, 20 pages.

(56) References Cited

OTHER PUBLICATIONS

Canright, D. and Batina, Lejla, "A Very Compact "Perfectly Masked" S-Box for AES (corrected)", revised Nov. 28, 2008, https://eprint.iacr.org/2009/011.pdf, 16 pages.

* cited by examiner

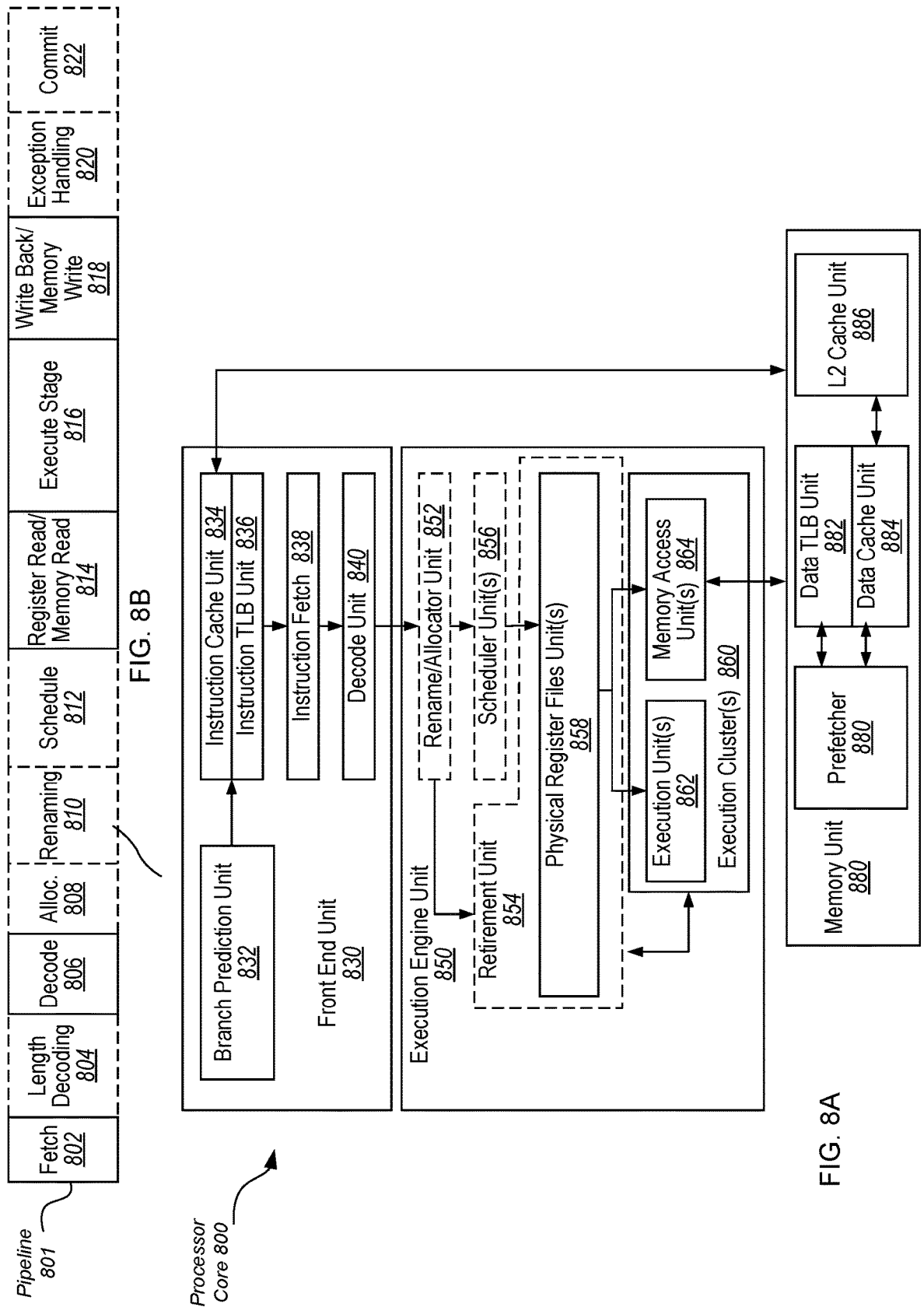

US 11,507,699 B2

PROCESSOR WITH PRIVATE PIPELINE

TECHNICAL FIELD

This disclosure generally relates to computer technology, and more specifically to on-die signal termination in multi-chip packages.

BACKGROUND

Various regulations (e.g., General Data Protection Regulation (GDPR)), require data within computer systems to be encrypted both at rest (e.g., by performing disk encryption) and at run-time (e.g., by performing main memory encryption or chip-to-chip encryption). Furthermore, industry standards require the use of standardized ciphers and cipher modes for data encryption at rest (e.g., AES-XTS) and at run-time (e.g., AES-GCM).

BRIEF DESCRIPTION OF THE DRAWINGS

FIG. 8A is a block diagram illustrating a micro-architecture for an example processor that incorporates a private processing pipeline operating in accordance with one or more aspects of the present disclosure.

FIG. 8B is a block diagram illustrating an in-order pipeline and a register renaming stage, out-of-order issue/execution pipeline implemented by an example processor of FIG. 8A.

DETAILED DESCRIPTION

Figure 1:
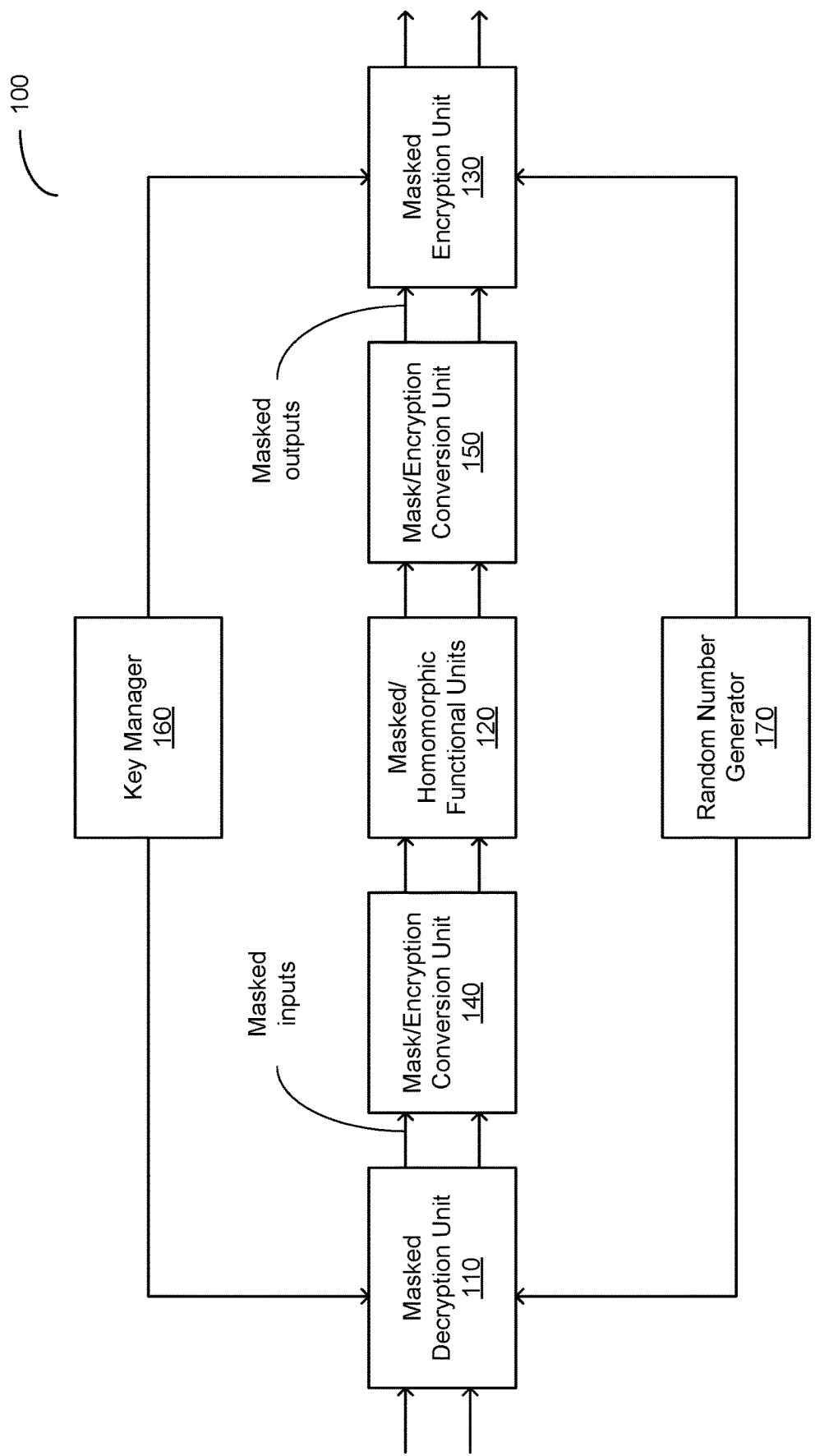
FIG. 1 schematically illustrates an example private processing pipeline architecture implemented in accordance with one or more aspects of the present disclosure.

Various regulations (e.g., General Data Protection Regulation (GDPR)), require data within computer systems to be encrypted both at rest (e.g., by performing disk encryption) and at run-time (e.g., by performing main memory encryption or chip-to-chip encryption). Furthermore, industry standards require the use of standardized ciphers and cipher modes for data encryption at rest (e.g., AES-XTS) and at run-time (e.g., AES-GCM).

Thus, the data to be computed upon is stored in an encrypted form. Before performing computations, the data needs to be retrieved from the disk, decrypted, and re-encrypted to the main memory; then, the data needs to be retrieved from the main memory, decrypted, and stored in the processor cache memory. Thus, the data in the cache memory appears in the clear (unencrypted) form, so that the processor can fetch the data, operate upon it, and store the results in the cache memory. Then, the data from the cache memory is encrypted to the main memory and further re-encrypted to the disk.

The above-described procedure is vulnerable to several data privacy risks. The data in the clear (unencrypted) form residing in the cache can be exfiltrated by copying, snooping or side-channel analysis. Besides, side-channel analysis can be employed for reconstructing the cryptographic keys protecting the encrypted data. "Side channel analysis" herein shall refer to a method of deriving one or more protected information items from certain aspects of the physical implementation and/or operation of the target data processing device by measuring values of one or more physical parameters associated with operations of the target data processing device, such as power consumption by certain circuits, heat or electromagnetic radiation emitted by the target data processing device, etc. In order to provide data privacy, computer systems should be capable of computing on encrypted data.

Aspects of the present disclosure overcome the above-noted deficiencies and ensure compliance with pertinent regulations and industry standards by providing systems that are capable of computing on encrypted data while being compliant to industry standard cryptographic practices. In particular, the private processing pipelines described herein ensure that the data is encrypted at any stage of its lifetime (even when computed on in the functional units); thus, even very strong attackers that control the majority of the privileged levels except for the level in control of the key management would not be able to read the data. The private processing pipelines described herein further ensure that the data at rest and in main memory follows standard practices in storage encryption (e.g., using the appropriate modes of AES), thus allowing for legacy compatibility and extensibility. The private processing pipelines described herein are resistant to first-order side-channel attacks; in some implementations, protection against higher-order side-channel attack may also be implemented. Furthermore, implementations of the functional units (the examples in GF(2^n)) may exhibit a constant time, thus the data cannot be obtained via timing side-channel attacks.

The example private processing pipelines described herein may be utilized for combining multiple functional units in a domain-specific private data path (e.g., for performing integer and fixed-point computations, such as multiply-and-add, multiply-and-reduce, compare (sign), etc.). In particular, the systems and methods described herein may be employed for performing training and inference stages of various artificial intelligence (AI)-based solutions, such as trainable classifiers, artificial neural networks, etc.

Thus, the private pipeline architecture described herein ensures data privacy and is resistant to at least first-order side-channel attacks. Furthermore, the private pipeline architecture described herein is more efficient, in terms of compute time and the hardware footprint, that various conventional techniques that provide data privacy and security.

FIG. 1 schematically illustrates an example private processing pipeline architecture implemented in accordance with one or more aspects of the present disclosure. The private processing pipeline may be implemented as a stand-alone pipeline or may augment the traditional pipeline of a microprocessor by adding a functional unit capable of computing on encrypted data, where the encrypted data is encrypted with a mode of operation of a standardized block cipher, such as AES.

In the following description, the term "masked operation" shall refer to masked implementations of a block cipher E that accepts a message m and a key k as its input and produces a cipher text c=E(m, k). The decryption procedure for the same block cipher recovers m=D(c, k). A masked implementation accepts as input a masked input m'=m+$m_a$ (where + is a XOR or an arithmetic operation) and an input mask $m_a$ (a random number) and a key k. It produces as output a masked cipher text c'=c+$m_c$, and an output mask $m_a$. The ciphertext can be eliminated by inverting the masking operation. So, (c', $m_c$)=maskedE(m', $m_a$, k). Similarly, (m', $m_a$)=maskedD(c', $m_c$, k).

As schematically illustrated by FIG. 1, the private processing pipeline 100 includes a masked decryption unit 110, one or more masked functional units 120, and a masked encryption unit 130. The masked decryption unit 110 performs a masked decryption operation to transform the input data (which may be encrypted, e.g., by AES-XTS or another standard mode of operation) into masked decrypted data (e.g., protected by an arithmetic or Boolean mask), and then feeds the masked decrypted data to the input of the masked functional unit 120. Since the masked decryption operation utilizes masked cryptographic keys, the cryptographic keys would never appear in the clear in a memory or on a communication bus, and thus would ensure data privacy.

The masked functional unit 120 may implement various arithmetic operations (e.g., multiplication, addition, and/or comparison) on the masked data, and therefore the data would never appear in the clear in the memory or on a communication bus. Furthermore, refreshing the masks at each operation within the functional unit ensures side channel resistance of the masked functional unit 120.

In various implementations, the masked functional unit 120 may be represented by a wide variety of functional units that compute on encrypted data, provided that the appropriate conversion is performed between the encryption types implemented by the masked functional unit 120 and other components of the computing system that employs the processing pipeline 100. The conversion may be performed by optional mask/encryption conversion units 140 and 150.

The masked output of the masked functional unit 120 is fed to the masked encryption unit 130, which performs a masked encryption operation to transform the output of the masked functional unit 120 to the encrypted result. Since the masked encryption operation utilizes masked cryptographic keys, the cryptographic keys would never appear in the clear in a memory or on a communication bus, and thus would ensure data privacy.

The private processing pipeline 100 may further include a cryptographic key manager 160 and a random number generator 170. The cryptographic key manager 160 may be employed for securely supplying secret cryptographic keys for encryption and decryption operations. The random number generator 170 for generating the cryptographic masks for masking operations.

Thus, the disclosed architecture of the private processing pipeline ensures that the data is never revealed in the clear at any point in time, from loading the encrypted data from the memory or other components of the computing system to the private processing pipeline 100, performed computations upon the data, and outputting the encrypted data to the memory or other components of the computing system that employs the private processing pipeline 100.

It should be noted that FIG. 1 is merely illustrative and should not be construed as limiting. In some implementations, masking operations performed by the units of the private pipeline 100 may be replaced by other cryptographic operations. The illustrated components may be configured in various ways and some examples may include more components or fewer components than depicted.

Figure 2:
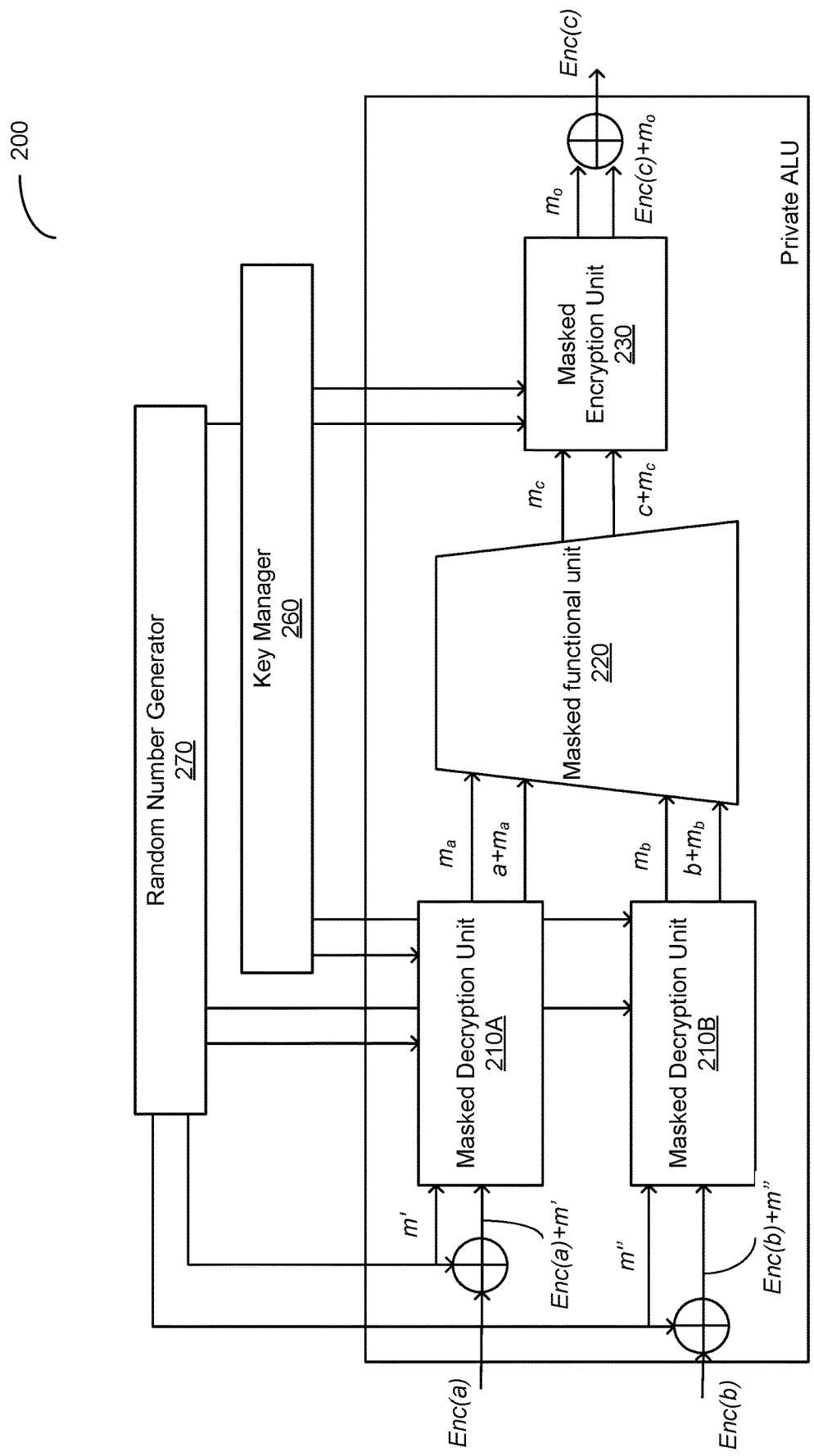
FIG. 2 schematically illustrates an example implementation of the private processing pipeline architecture for integer computations performed within the Galois field $GF(2^n)$.

FIG. 2 schematically illustrates an example implementation of the private processing pipeline architecture 100 of FIG. 1 for integer computations performed within the Galois field GF($2^n$). As schematically illustrated by FIG. 2, the private processing pipeline 200 includes two masked decryption units 210A-210B, a masked functional unit 220, and a masked encryption unit 230. The masked decryption units 210A-210B perform a masked decryption operation to transform the respective encrypted inputs Enc(a) and Enc(b) to the masked outputs. In particular, the masked decryption unit 210A performs a masked decryption operation (e.g., masked AES decryption operation) on the received combination of encrypted input Enc(a) and the mask m' that has been generated by the mask generator 270, and produces masked decrypted outputs $m_a$ and a+$m_a$. Similarly, the masked decryption unit 210B performs a masked decryption operation (e.g., masked AES decryption operation) on the received combination of encrypted input Enc(b) and the mask m' that has been generated by the mask generator 270, and produces masked decrypted outputs $m_b$ and b+$m_b$. In FIG. 2, the encircled plus sign ("⊕") denotes the exclusive disjunction (XOR) operation (such that a+a=0).

The outputs of the masked decryption units 210A-210B are fed to the masked functional unit 220, which performs one or more arithmetic operations (e.g., addition, multiplication, or their combination) on the masked inputs, and produces masked outputs $m_c$ and c+$m_c$, as described in more detail herein below. The masked outputs of the masked functional unit 220 are fed to the masked encryption unit 230, which performs a masked encryption operation (e.g., a masked AES encryption operation) on its inputs and produces the encrypted masked output Enc(c)+$m_o$, which is then unmasked by performing the exclusive disjunction operation with the mask value $m_o$, so that the output of the private processing pipeline 200 is represented by the encrypted result Enc(c) of the arithmetic operations performed by the masked functional unit 220.

The cryptographic keys for the masked decryption and encryption operations are supplied by the cryptographic key manager 260. It should be noted that FIG. 2 is merely illustrative and should not be construed as limiting. In some implementations, the private processing pipeline 200 may be generalized to arithmetic computations outside the Galois field. Furthermore, various other implementations of the private processing pipeline architecture 100 of FIG. 1 may be utilized for direct computation or to look-up tables, as described in more detail herein below. The illustrated components may be configured in various ways and some examples may include more components or fewer components than depicted.

As noted herein above, the functional unit 120 of FIG. 1 may perform one or more arithmetic operations (e.g., addition, multiplication, or their combination) on the masked inputs and produces masked outputs. In particular, the functional unit may perform a masked multiplication operation, as schematically illustrated by FIG. 3.

Figure 3:
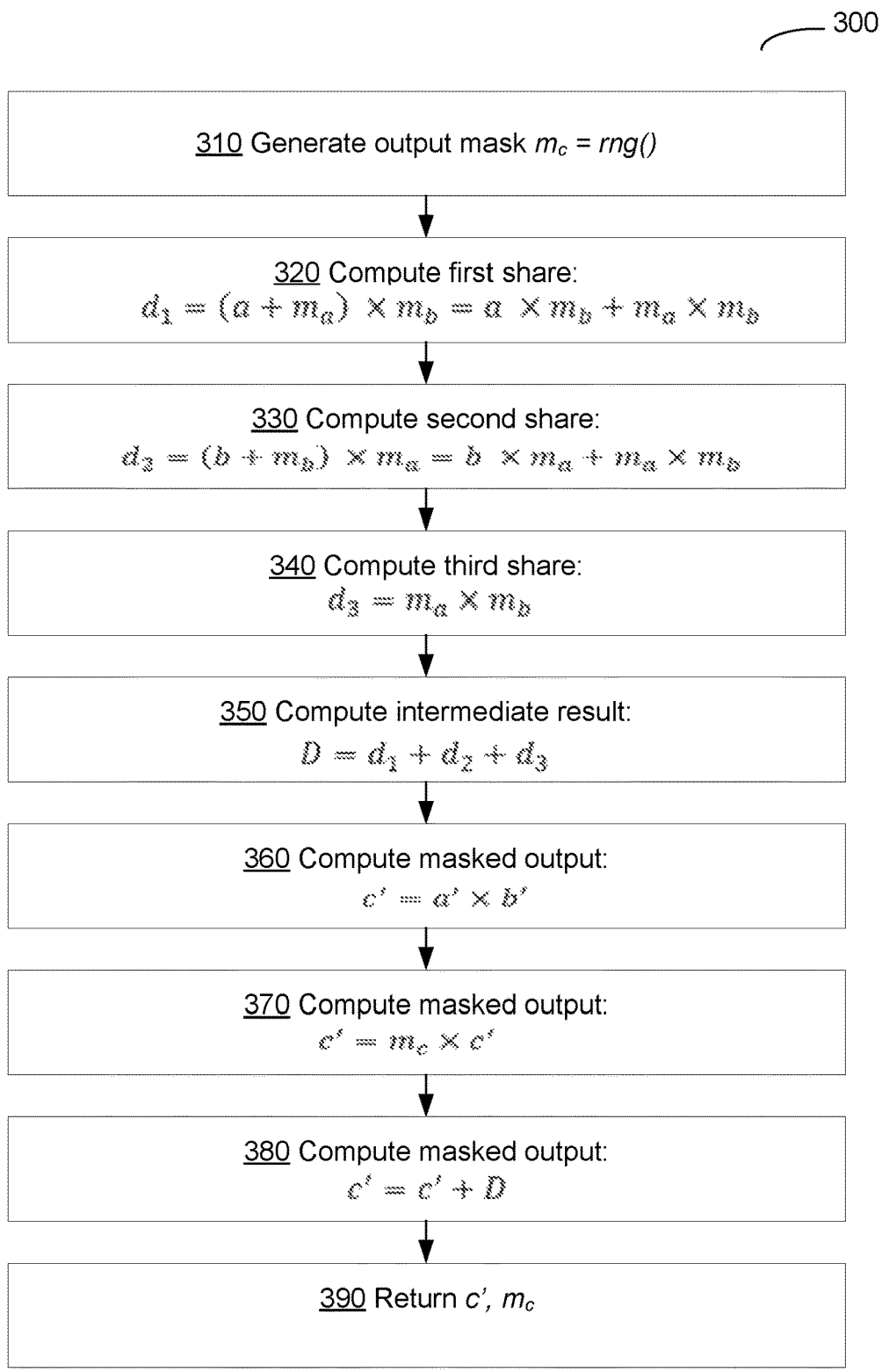
FIG. 3 depicts a flow diagram of an example method of performing a masked multiplication operation by a functional unit operating in accordance with one or more aspects of the present disclosure.

FIG. 3 depicts a flow diagram of an example method of performing a masked multiplication operation by a functional unit operating in accordance with one or more aspects of the present disclosure. Method 300 and/or each of its individual functions, routines, subroutines, or operations may be performed by one or more hardware modules.

Assuming that $c=a\times b$ denotes a multiplication operation with all operands and output in the clear, and that a', b', c' denote the corresponding masked inputs and outputs (e.g., by applying a Boolean mask), i.e., $a'=a+m_a$, $b'=b+m_b$, and $c'=c+m_c$, where $m_a$, $m_b$ and $m_c$ are random integers masking the inputs and the output respectively, the functional unit performing method 300 accepts masked inputs $a'=a+m_a$ and $b'=b+m_b$, as well as input masks $m_a$ and $m_b$, perform a masked multiplication operation, and return a masked output $c'=c+m_c$, as well as the output mask $m_c$.

At block 310, the functional unit generates a random integer to be utilized as the output mask $m_c$:

$$m_c=rng(\ )$$

At block 320, the functional unit computes the first share $d_1$ of the intermediate result D as a product of multiplying the first masked input a' by the second mask $m_b$:

$$d_1=(a+m_a)\times m_b=a\times m_b+m_a\times m_b$$

At block 330, the functional unit computes the second share $d_2$ of the intermediate result D as a product of multiplying the second masked input b' by the first mask $m_b$:

$$d_2=(b+m_b)\times m_a=b\times m_a+m_a\times m_b$$

At block 340, the functional unit computes the third share $d_3$ of the intermediate result D as a product of multiplying the first mask $m_a$ by the second mask $m_b$:

$$d_3=m_a\times m_b$$

At block 350, the functional unit computes the intermediate result D as the sum of the three shares:

$$D=d_1+d_2+d_3$$

At block 360, the functional unit computes the masked sum c' as a product of multiplying the first masked input a' by the second masked input b':

$$c'=a'\times b'$$

It should be noted that $a'\times b'=(a+m_a)\times(b+m_b)=(a\times b)+(b\times m_a)+(a\times m_b)(m_a\times m_b)$.

At block 370, the functional unit multiplies the computed masked output c' by the output mask $m_c$:

$$c'=m_c\times c'$$

It should be noted that $m_c\times c'=m_c+(a'\times b')$.

At block 380, the functional unit adds the intermediate result D to the computed masked output c':

$$c'=c'+D$$

It should be noted that $c'+D=m_c+(a\times b)$.

At block 390, the functional unit outputs the computed masked output c' and the output mask $m_c$, and the method terminates.

As noted herein above, the functional unit performs one or more arithmetic operations (e.g., addition, multiplication, or their combination) on the masked inputs and produces masked outputs. In particular, the functional unit may perform a masked addition operation, as schematically illustrated by FIG. 4.

Figure 4:
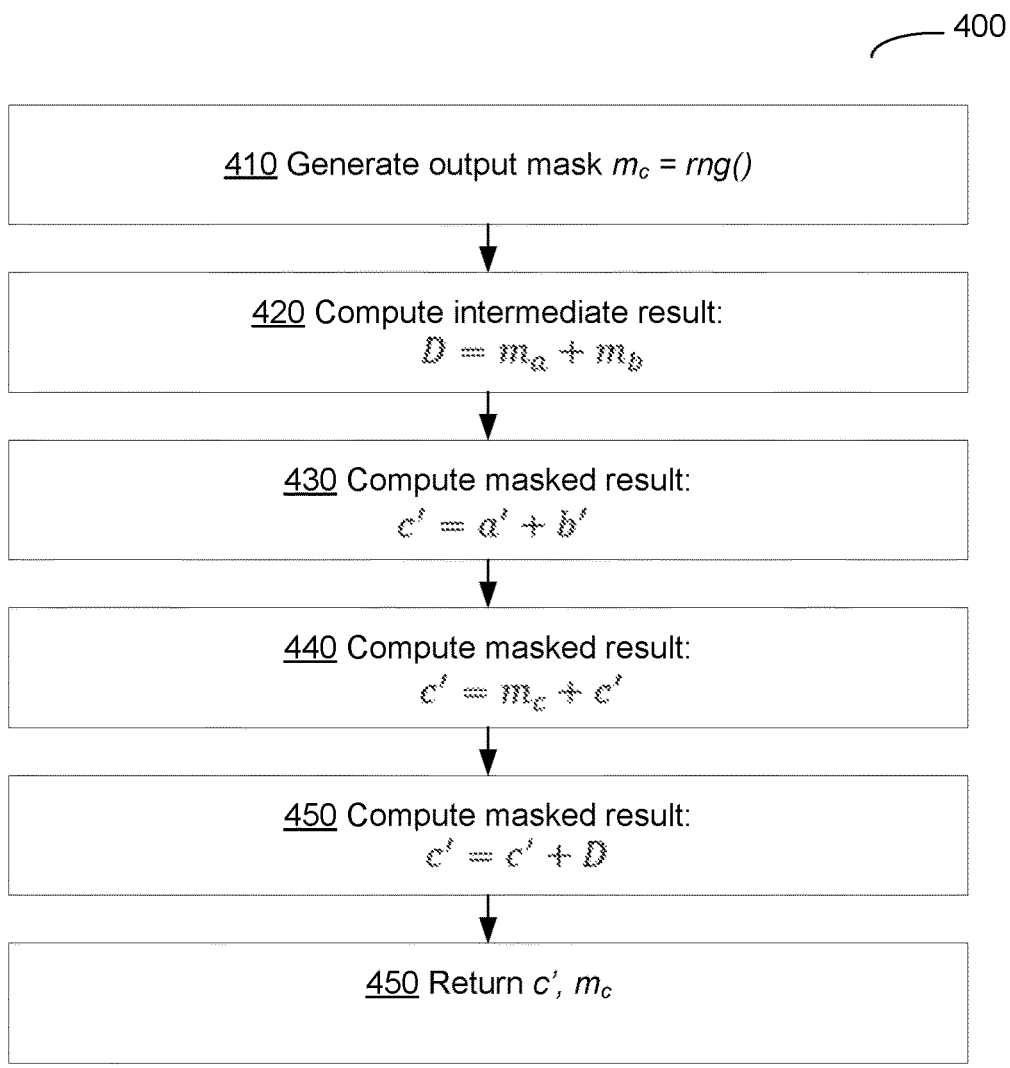
FIG. 4 depicts a flow diagram of an example method of performing a masked addition operation by a functional unit operating in accordance with one or more aspects of the present disclosure.

FIG. 4 depicts a flow diagram of an example method of performing a masked addition operation by a functional unit operating in accordance with one or more aspects of the present disclosure. Method 400 and/or each of its individual functions, routines, subroutines, or operations may be performed by one or more hardware modules.

Assuming that $c=a+b$ denotes an addition operation with all operands and output in the clear and that a', b', and c' denote the corresponding masked inputs and outputs (e.g., by applying a Boolean mask), i.e., $a'=a+m_a$, $b'=b+m_b$, and $c'=c+m_c$, where $m_a$, $m_b$ and $m_c$ are random integers masking the inputs and the output respectively, the functional unit performing method 400 accepts masked inputs $a'=a+m_a$ and $b'=b+m_b$, as well as input masks $m_a$ and $m_b$, perform a masked addition operation, and return a masked output $c'=c+m_c$, as well as the output mask $m_c$.

At block 410, the functional unit generates a random integer to be utilized as the output mask $m_c$:

$$m_c=rng(\ )$$

At block 420, the functional unit computes the intermediate result D as the sum of the two input masks $m_a$ and $m_b$:

$$D=m_a+m_b$$

At block 430, the functional unit computes the masked result c' as the sum of the two masked inputs a' and b':

$$c'=a'+b'$$

It should be noted that $a'+b'=(a+m_a)+(b+m_b)=(a+b)+m_a+m_b$.

At block 440, the functional unit applies the mask c' to the computed result c':

$$c'=m_c+c'$$

It should be noted that $m_c+c'=m_c+(a'+b')$.

At block 450, the functional unit adds the intermediate result D to the computed result c':

$$c'=c'+D$$

It should be noted that $c'+D=m_c+(a+b)$.

At block 460, the functional unit outputs the masked result c' and the mask $m_c$, and the method terminates.

Figure 5:
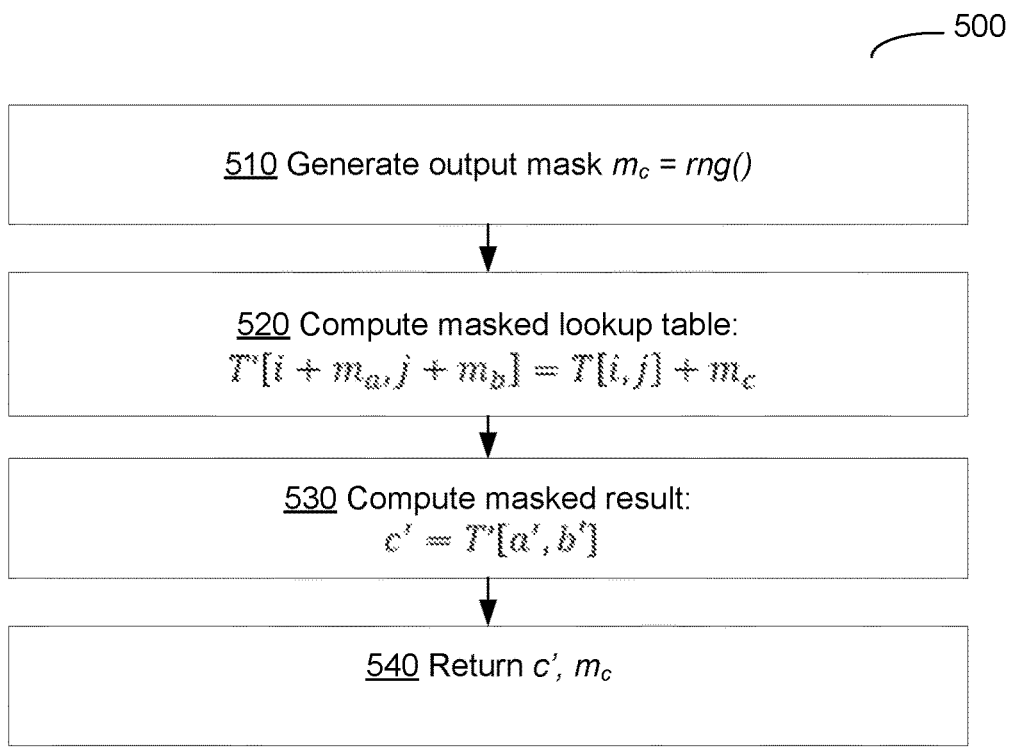
FIG. 5 depicts a flow diagram of an example method of implementing a masked lookup table by a functional unit operating in accordance with one or more aspects of the present disclosure.

FIG. 5 depicts a flow diagram of an example method of implementing a masked lookup table by a functional unit operating in accordance with one or more aspects of the present disclosure. Method 500 and/or each of its individual functions, routines, subroutines, or operations may be performed by one or more hardware modules.

Assuming that T denotes a lookup table returning an element c identified by two inputs a and b, such that c=T(a, b) with all operands and output in the clear, the functional unit implementing method 500 accepts masked inputs $a'=a+m_a$ and $b'=b+m_b$, as well as input masks $m_a$ and $m_b$ and return a masked output $c'=c+m_c$, as well as the output mask $m_c$.

At block 510, the functional unit generates a random integer to be utilized as the mask: $m_c$=rng( ).

At block 520, the functional unit copies the element identified by indices (i, j) from the clear-text lookup table T to the masked lookup table T', while shifting the respective indices by the input mask:

$$T'[i+m_a, j+m_b]=T[i,j]+m_c$$

It should be noted that the index operations are performed by modulo the size of the operator table T.

At block 530, the functional unit computes the masked result c' as the element of the masked table T' identified by the masked inputs a' and b':

$$c'=T'[a',b']$$

At block 540, the functional unit outputs the masked result c' and the output mask $m_c$, and the method terminates.

As noted herein above, the functional unit performs one or more arithmetic operations (e.g., addition, multiplication, or their combination) on the masked inputs and produces masked outputs. In some implementations, the functional unit may further perform a masked comparison operation to compare two masked inputs, as schematically illustrated by FIG. 6.

Figure 6:
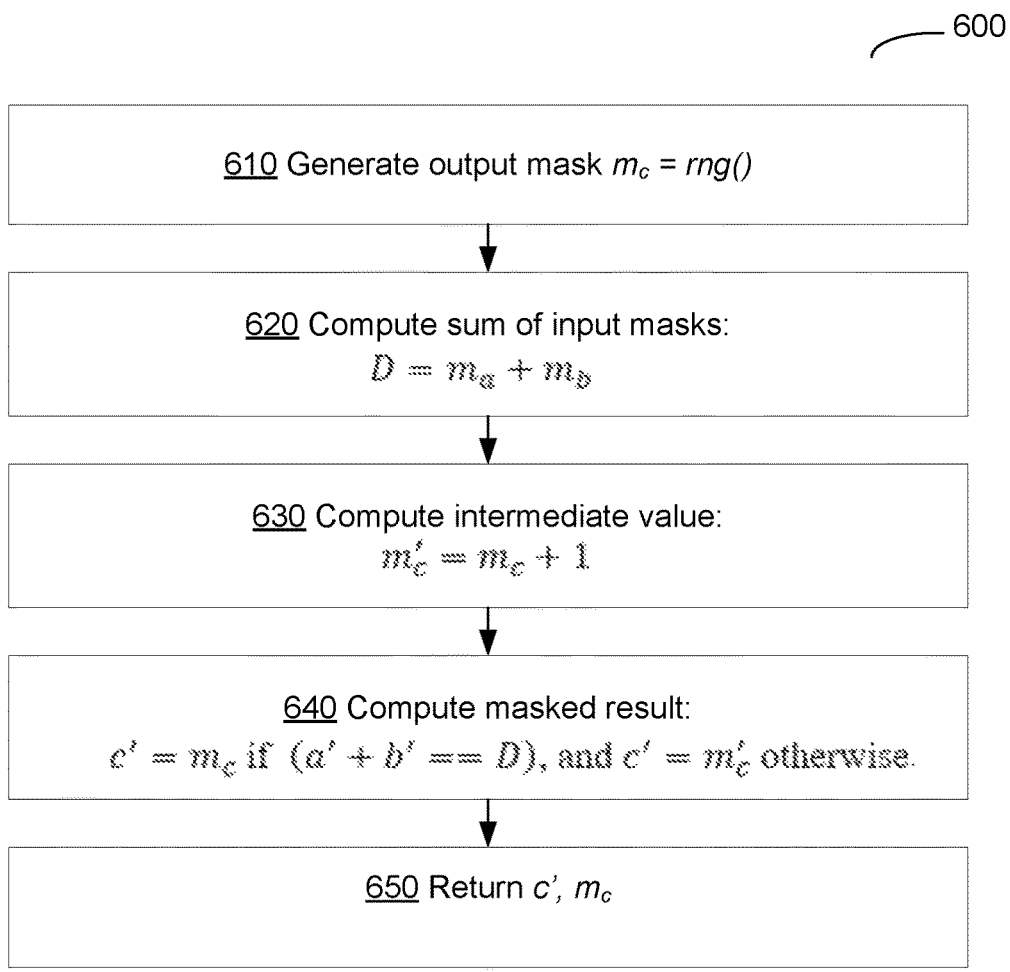
FIG. 6 depicts a flow diagram of an example method of masked comparison operation performed by a functional unit operating in accordance with one or more aspects of the present disclosure.

FIG. 6 depicts a flow diagram of an example method of masked comparison operation performed by a functional unit operating in accordance with one or more aspects of the present disclosure. Method 600 and/or each of its individual functions, routines, subroutines, or operations may be performed by one or more hardware modules. The functional unit implementing method 500 accepts masked inputs $a'=a+m_a$ and $b'=b+m_b$, as well as input masks $m_a$ and $m_b$ and return a masked output $c'=c+m_c$, as well as the output mask $m_c$.

At block 610, the functional unit generates a random integer to be utilized as the mask: $m_c$=rng( ).

At block 620, the functional unit computes the sum of two input masks:

$$D=m_a+m_b$$

At block 630, the functional unit computes the intermediate value of $$m'_c=m_c+1$$

At block 640, the functional unit computes the result c':

$$c'=m_c \text{ if } (a'+b'==D), \text{ and } c'=m'_c \text{ otherwise.}$$

At block 650, the functional unit outputs the masked result c' and the output mask $m_c$, and the method terminates.

Figure 7:
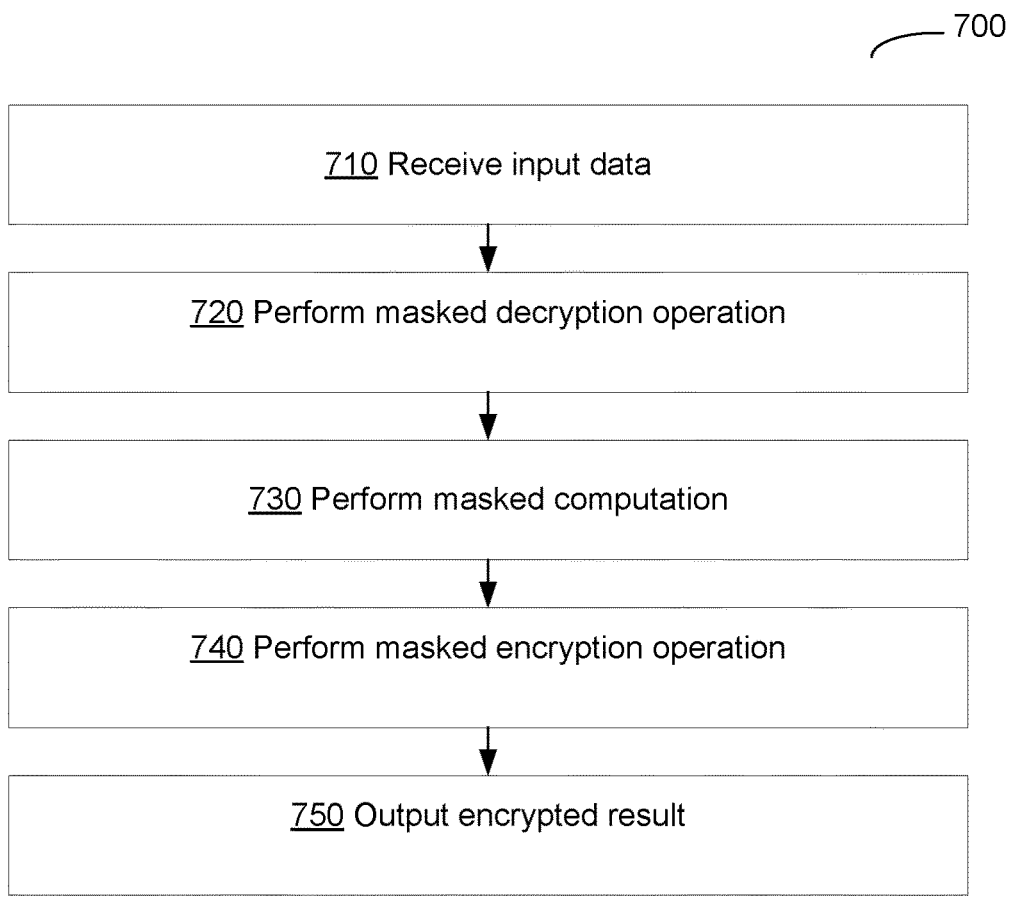
FIG. 7 depicts a flow diagram of an example method of performing computations by a private processing pipeline operating in accordance with one or more aspects of the present disclosure.

FIG. 7 depicts a flow diagram of an example method of performing computations by a private processing pipeline operating in accordance with one or more aspects of the present disclosure. Method 700 and/or each of its individual functions, routines, subroutines, or operations may be performed by one or more hardware modules.

At block 710, the private processing pipeline receives input data.

At block 720, the private processing pipeline performs, by a masked decryption unit, a masked decryption operation transforming input data into masked decrypted data, as described in more detail herein above.

At block 730, the private processing pipeline performs, by a masked functional unit, a masked operation on the masked decrypted data to produce a masked result, as described in more detail herein above.

At block 740, the private processing pipeline performs, by a masked encryption unit, a masked encryption operation transforming the masked result into an encrypted result, as described in more detail herein above.

At block 750, the private processing pipeline outputs the encrypted result, and the method terminates.

FIG. 8A is a block diagram illustrating a micro-architecture for an example processor that incorporates a private processing pipeline operating in accordance with one or more aspects of the present disclosure. Specifically, processor 800 depicts an in-order architecture core and a register renaming logic, out-of-order issue/execution logic to be included in a processor according to at least one implementation of the disclosure.

Processor 800 includes a front end unit 830 coupled to an execution engine unit 850, and both are coupled to a memory unit 880. The processor 800 may include a reduced instruction set computing (RISC) core, a complex instruction set computing (CISC) core, a very long instruction word (VLIW) core, or a hybrid or alternative core type. As yet another option, processor 800 may include a special-purpose core, such as, for example, a network or communication core, compression engine, graphics core, or the like. In one implementation, processor 800 may be a multi-core processor or may be part of a multi-processor system.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (also known as a decoder) decodes instructions and generates as an output one or more micro-operations, micro-code entry points, microinstructions, other instructions, or other control signals, which are decoded from, or which otherwise reflect, or are derived from, the original instructions. The decoder 840 may be implemented using various different mechanisms. Examples of suitable mechanisms include, but are not limited to, look-up tables, hardware implementations, programmable logic arrays (PLAs), microcode read only memories (ROMs), etc. The instruction cache unit 834 is further coupled to the memory unit 880. The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different scheduler circuits, including reservations stations (RS), central instruction window, etc. The scheduler unit(s) 856 is coupled to the physical register set(s) unit(s) 858. Each of the physical register set(s) units 858 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 858 is overlapped by the retirement unit 854 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 854 and the physical register set(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 856, physical register set(s) unit(s) 858, and execution cluster(s) 860 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 880, which includes a data prefetcher 880, a data TLB unit 882, a data cache unit (DCU) 884, and a level 2 (L2) cache unit 886, to name a few examples. In some implementations DCU 884 is also known as a first level data cache (L1 cache). The DCU 884 may handle multiple outstanding cache misses and continue to service incoming stores and loads. It also supports maintaining cache coherency. The data TLB unit 882 is a cache used to improve virtual address translation speed by mapping virtual and physical address spaces. In one exemplary implementation, the memory access units 864 includes a load unit, a store address unit, and a store data unit, each of which is coupled to the data TLB unit 882 in the memory unit 880. The L2 cache unit 886 may be coupled to one or more other levels of cache and eventually to a main memory.

In one implementation, the data prefetcher 880 speculatively loads/prefetches data to the DCU 884 by automatically predicting which data a program is about to consume. Prefetching refers to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching refers to the early retrieval of data from one of the lower level caches/memory to a data cache and/or prefetch buffer before the processor issues a demand for the specific data being returned.

The processor 800 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 8B is a block diagram illustrating an in-order pipeline and a register renaming stage, out-of-order issue/execution pipeline implemented by processor 800 of FIG. 8A according to some implementations of the disclosure. The solid lined boxes in FIG. 8B illustrate an in-order pipeline 801, while the dashed lined boxes illustrate a register renaming, out-of-order issue/execution pipeline 803. In FIG. 8B, the pipelines 801 and 803 include a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824. In some implementations, the ordering of stages 802-824 may be different than illustrated and are not limited to the specific ordering shown in FIG. 8B.

Figure 8C:
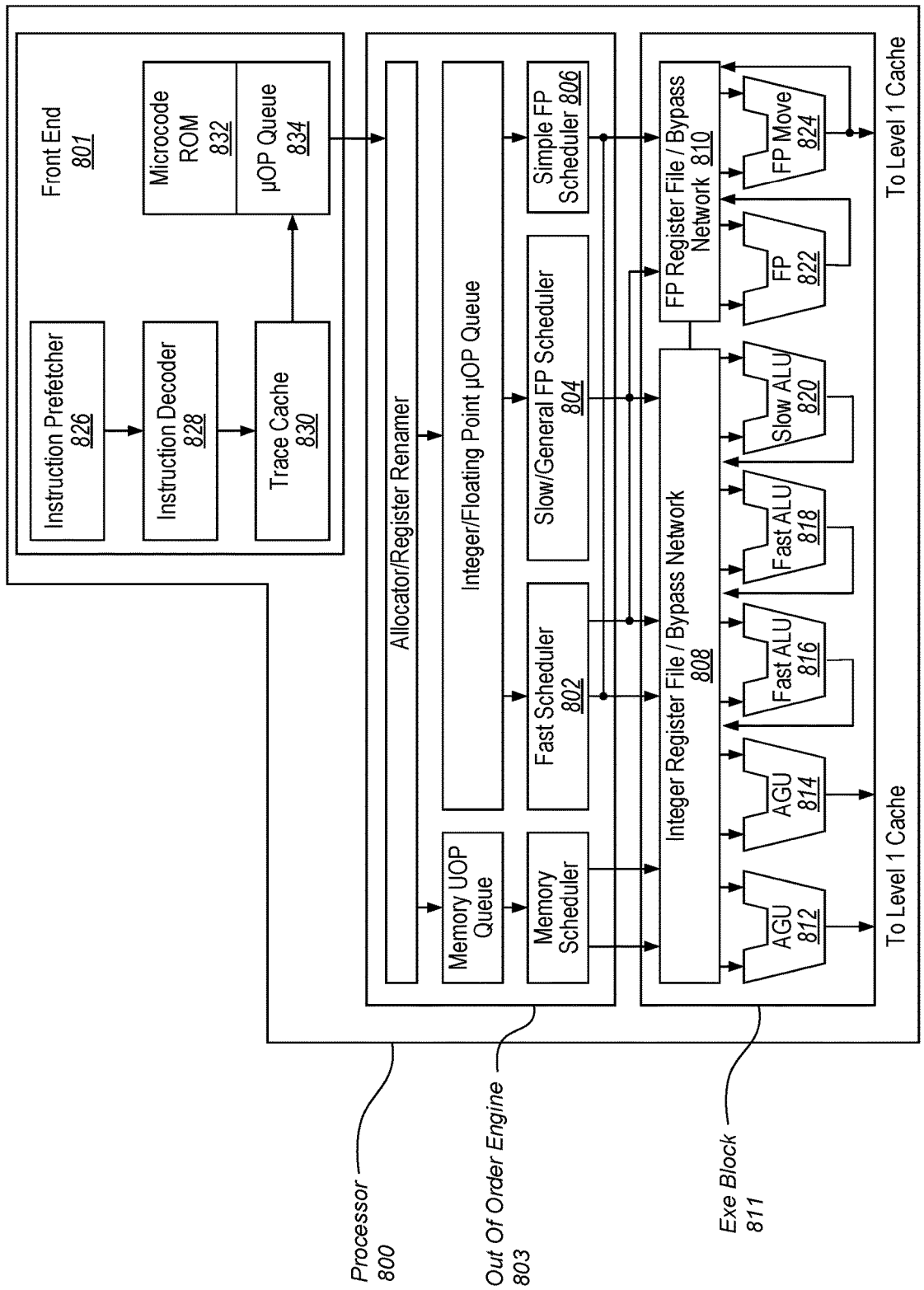
FIG. 8C is a block diagram illustrating a micro-architecture for another example processor that incorporates a private processing pipeline operating in accordance with one or more aspects of the present disclosure.

FIG. 8C is a block diagram illustrating a micro-architecture for another example processor that incorporates a private processing pipeline operating in accordance with one or more aspects of the present disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 801 is the part of the processor 800 that fetches instructions to be executed and prepares them to be used later in the processor pipeline. The implementations of the page additions and content copying can be implemented in processor 800.

The front end 801 includes several units. In one implementation, the instruction prefetcher 816 fetches instructions from memory and feeds them to an instruction decoder 818 which in turn decodes or interprets them. For example, in one implementation, the decoder decodes a received instruction into one or more operations called "micro-instructions"

or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, microcode ROM (or RAM) 832 provides the uops needed to complete the operation.

Some instructions are converted into a single micro-op, whereas others need several micro-ops to complete the full operation. In one implementation, if more than four micro-ops are needed to complete an instruction, the decoder 818 accesses the microcode ROM 832 to do the instruction. For one implementation, an instruction can be decoded into a small number of micro ops for processing at the instruction decoder 818. In another implementation, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation can schedule on each half of the main clock cycle while the other schedulers can only schedule once per main processor clock cycle. The schedulers arbitrate for the dispatch ports to schedule uops for execution.

Register sets 808, 810, sit between the schedulers 802, 804, 806, and the execution units 812, 814, 816, 818, 820, 822, 824 in the execution block 811. There is a separate register set 808, 810, for integer and floating point operations, respectively. Each register set 808, 810, of one implementation also includes a bypass network that can bypass or forward just completed results that have not yet been written into the register set to new dependent uops. The integer register set 808 and the floating point register set 810 are also capable of communicating data with the other. For one implementation, the integer register set 808 is split into two separate register sets, one register set for the low order 32 bits of data and a second register set for the high order 32 bits of data. The floating point register set 810 of one implementation has 128 bit wide entries because floating point instructions typically have operands from 64 to 128 bits in width.

The execution block 811 contains the execution units 812, 814, 816, 818, 820, 822, 824, where the instructions are actually executed. This section includes the register sets 808, 810, that store the integer and floating point data operand values that the micro-instructions need to execute. The processor 800 of one implementation is comprised of a number of execution units: address generation unit (AGU) 812, AGU 814, fast ALU 816, fast ALU 818, slow ALU 820, floating point ALU 812, floating point move unit 814. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 816, 818. The fast ALUs 816, 818, of one implementation can execute fast operations with an effective latency of half a clock cycle. For one implementation, most complex integer operations go to the slow ALU 820 as the slow ALU 820 includes integer execution hardware for long latency type of operations, such as a multiplier, shifts, flag logic, and branch processing. Memory load/store operations are executed by the AGUs 822, 824. For one implementation, the integer ALUs 816, 818, 820, are described in the context of performing integer operations on 64 bit data operands. In alternative implementations, the ALUs 816, 818, 820, can be implemented to support a variety of data bits including 16, 32, 128, 256, etc. Similarly, the floating point units 822, 824, can be implemented to support a range of operands having bits of various widths. For one implementation, the floating point units 822, 824, can operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" refers to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 9:
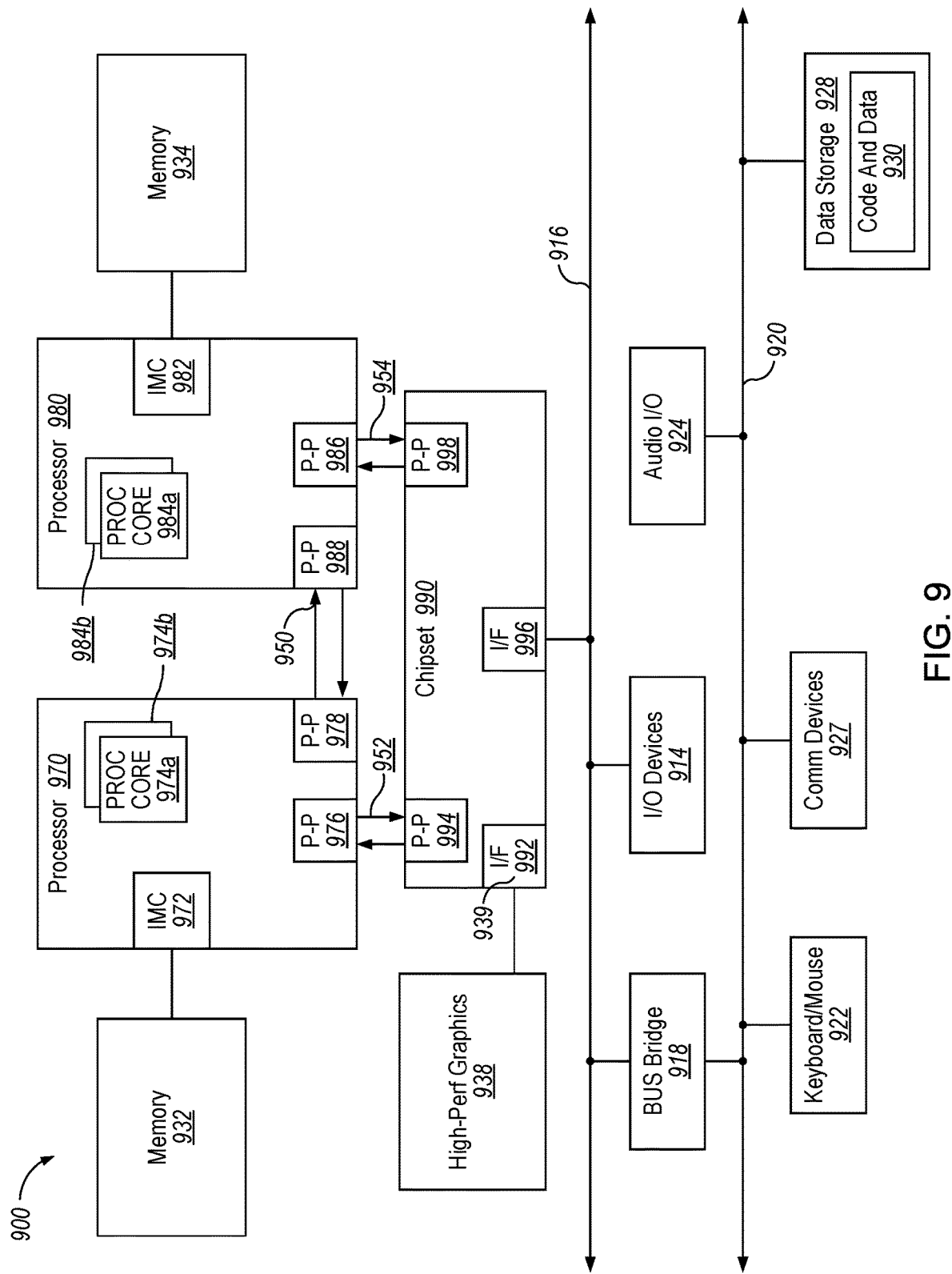
FIG. 9 is a block diagram of a multiprocessor system that incorporates a private processing pipeline operating in accordance with one or more aspects of the present disclosure.

Implementations may be implemented in many different system types. Referring now to FIG. 9, shown is a block diagram of a multiprocessor system 900 that incorporates a private processing pipeline operating in accordance with one or more aspects of the present disclosure. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors. While shown with two processors 970, 980, it is to be understood that the scope of the disclosure is not so limited. In other implementations, one or more additional processors may be present in a given processor.

Processors 970 and 980 are shown including integrated memory controller units 972 and 982, respectively. Processor 970 also includes as part of its bus controller units point-to-point (P-P) interfaces 976 and 988; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

Chipset 990 is be coupled to a first bus 916 via an interface 996. In one implementation, first bus 916 may be a Peripheral Component Interconnect (PCI) bus, or a bus such as a PCI Express bus or interconnect bus, although the scope of the disclosure is not so limited.

Figure 10:
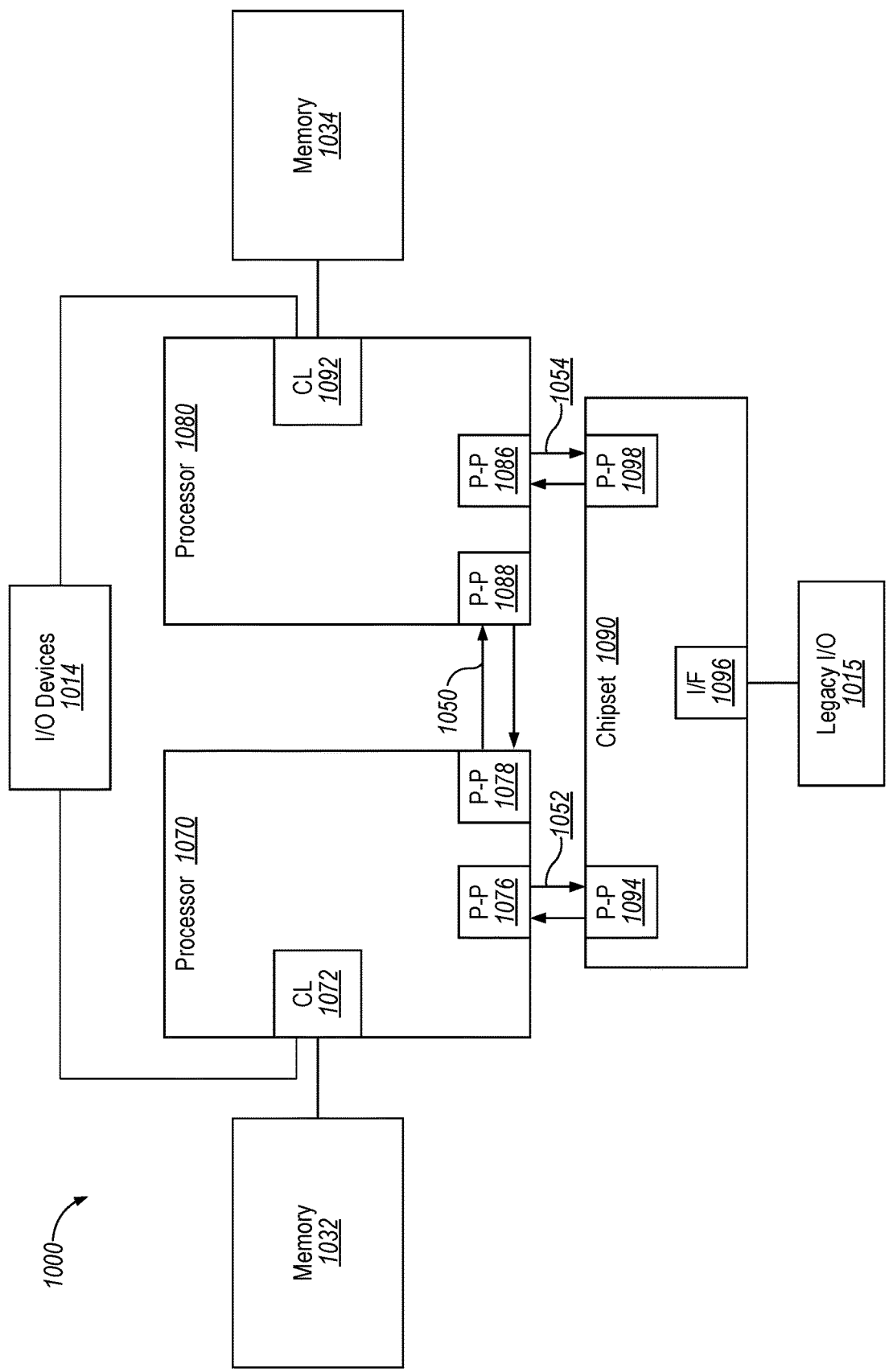
FIG. 10 is a block diagram of another multiprocessor system that incorporates a private processing pipeline operating in accordance with one or more aspects of the present disclosure.

Referring now to FIG. 10, shown is a block diagram of another multiprocessor system 1000 that incorporates a private processing pipeline operating in accordance with one or more aspects of the present disclosure. Like elements in FIGS. 9 and 10 bear like reference numerals and certain aspects of FIG. 10 have been omitted from FIG. 9 in order to avoid obscuring other aspects of FIG. 9.

FIG. 10 illustrates that the processors 1070, 1080 includes integrated memory and I/O control logic ("CL") 1072 and 1092, respectively. For at least one implementation, the CL 1072, 1082 includes integrated memory controller units such as described herein. In addition. CL 1072, 1092 may also include I/O control logic. FIG. 10 illustrates that the memories 1032, 1034 are coupled to the CL 1072, 1092, and that I/O devices 1014 are also coupled to the control logic 1072, 1092. Legacy I/O devices 1015 are coupled to the chipset 1090.

Figure 11:
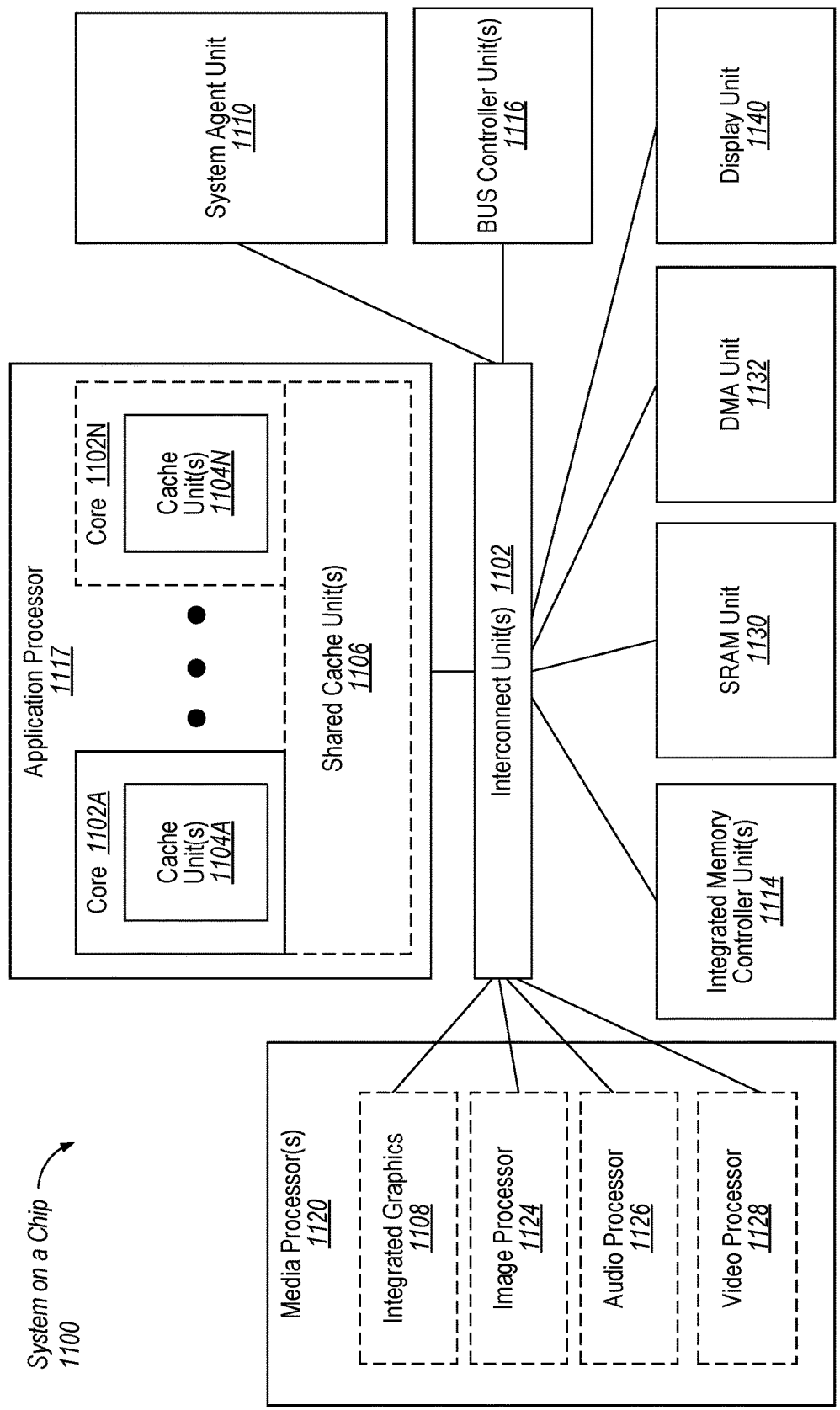
FIG. 11 is a block diagram of an example system on a chip (SoC) that includes one or more of the cores that incorporates a private processing pipeline operating in accordance with one or more aspects of the present disclosure.

FIG. 11 is a block diagram of an example system on a chip (SoC) that includes one or more of the cores that incorporates a private processing pipeline operating in accordance with one or more aspects of the present disclosure. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1100 of FIG. 11, dashed lined boxes are features on more advanced SoCs. An interconnect unit(s) 1102 is coupled to: an application processor 1117 which includes a set of one or more cores 1102A-N and shared cache unit(s) 1106; a system agent unit 1110; a bus controller unit(s) 1116; an integrated memory controller unit(s) 1114; a set of one or more media processors 1120 which may include integrated graphics logic 1108, an image processor 1124 for providing still and/or video camera functionality, an audio processor 1126 for providing hardware audio acceleration, and a video processor 1128 for providing video encode/decode acceleration; a static random access memory (SRAM) unit 1130; a direct memory access (DMA) unit 1132; and a display unit 1140 for coupling to one or more external displays.

Figure 12:
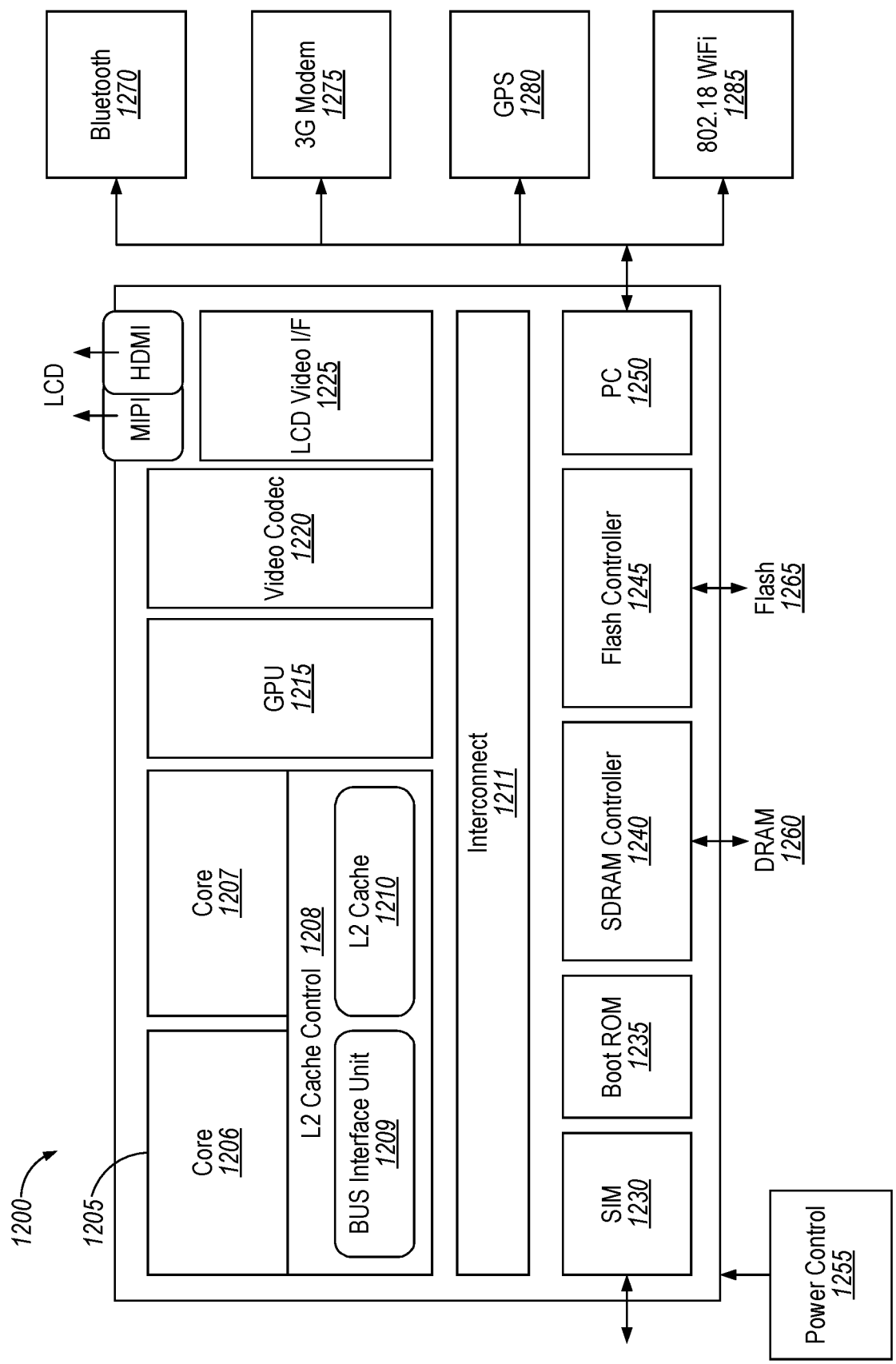
FIG. 12 is a block diagram of another example system on a chip (SoC) that includes one or more of the cores that incorporates a private processing pipeline operating in accordance with one or more aspects of the present disclosure.

Turning next to FIG. 12, shown is a block diagram of another example system on a chip (SoC) that includes one or more of the cores that incorporate a private processing pipeline operating in accordance with one or more aspects of the present disclosure. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1200.

Here, SoC 1200 includes two cores—1206 and 1207. Similar to the discussion above, cores 1206 and 1207 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

In one implementation, SDRAM controller 1240 connects to interconnect 1211 via cache 1210. Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth® module 1270, 3G modem 1275, GPS 1280, and Wi-Fi® 1285. Note as stated above, a UE includes a radio for communication. As a result, these peripheral communication modules may not all be included. However, in a UE some form of a radio for external communication should be included.

Figure 13:
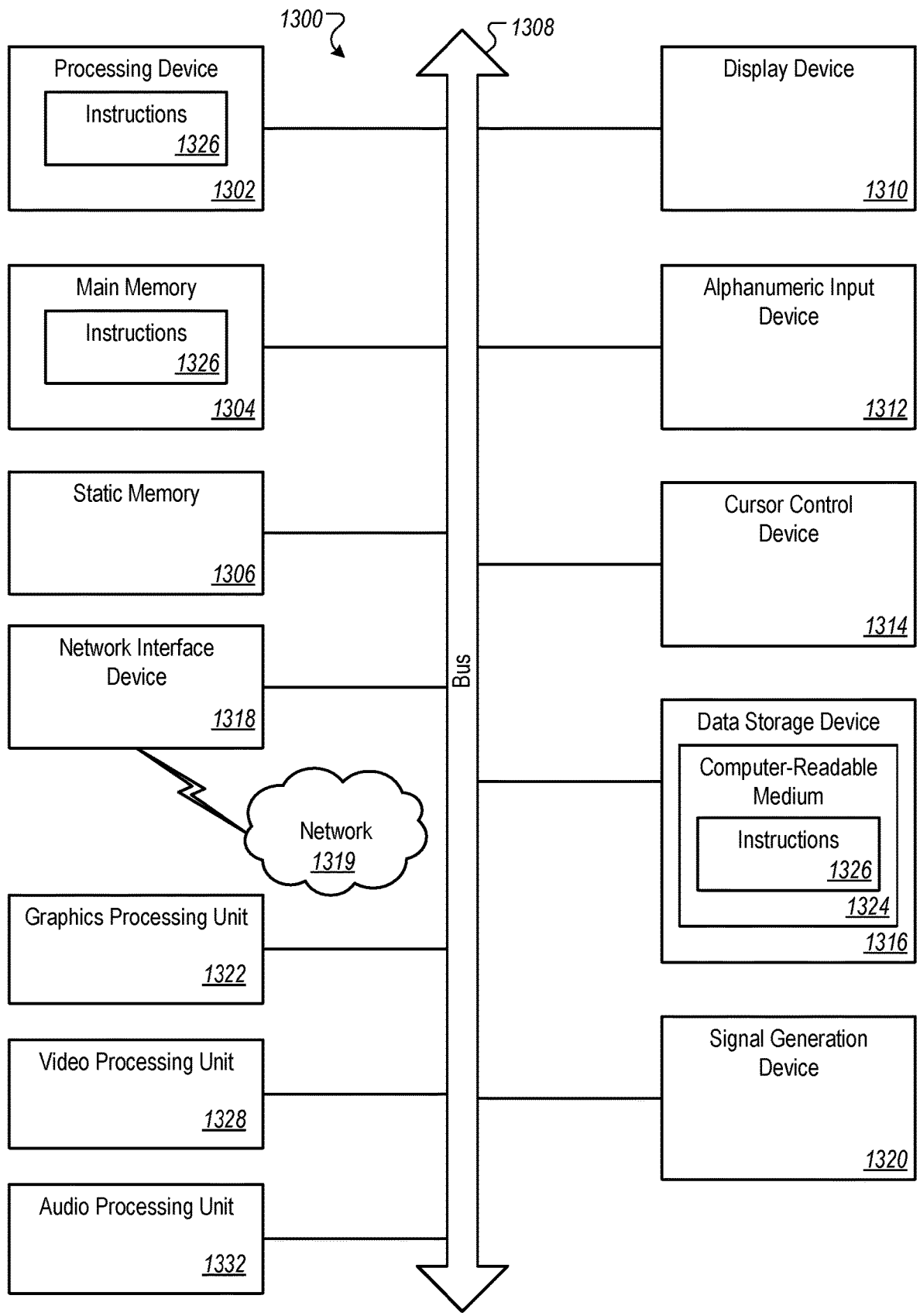
FIG. 13 illustrates a diagrammatic representation of a machine in the example form of a computing system within which a set of instructions, for causing the machine to implement a private processing pipeline operating in accordance with one or more aspects of the present disclosure.

FIG. 13 illustrates a diagrammatic representation of a machine in the example form of a computing system 1300 within which a set of instructions, for causing the machine to implement a private processing pipeline operating in accordance with one or more aspects of the present disclosure. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1300.

The computing system 1300 includes a processing device 1302, main memory 1304 (e.g., flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1316, which communicate with each other via a bus 1308.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application-specific integrated circuit (ASIC), a field programmable gate array (FPGA), a digital signal processor (DSP), network processor, or the like. In one implementation, processing device 1302 includes one or more processor cores. The processing device 1302 is configured to execute the processing logic 1326 for performing the operations discussed herein.

In one implementation, processing device 1302 can be part of a processor or an integrated circuit that includes the disclosed LLC caching architecture. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1318 communicably coupled to a network 1319. The computing system 1300 also may include a video display device 1310 (e.g., a liquid crystal display (LCD) or a cathode ray tube (CRT)), an alphanumeric input device 1312 (e.g., a keyboard), a cursor control device 1314 (e.g., a mouse), a signal generation device 1320 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1316 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic during execution thereof by the computing system 1300; the main memory 1304 and the processing device 1302 also constituting computer-readable storage media.

The computer-readable storage medium 1324 may also be used to store instructions 1326 utilizing the processing device 1302, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is a processing system, comprising: a masked decryption unit circuit to perform a masked decryption operation transforming input data into masked decrypted data; a masked functional unit circuit to produce a masked result by performing a masked arithmetic operation on the masked decrypted data; and a masked encryption unit circuit to perform a masked encryption operation transforming the masked result into an encrypted result.

Example 2 is the processing system of Example 1, wherein the masked arithmetic operation comprises at least one of: a masked addition operation or a masked multiplication operation.

Example 3 is the processing system of any of Examples 1-2, wherein the masked arithmetic operation comprises a masked comparison operation.

Example 4 is the processing system of any of Examples 1-3, wherein the masked arithmetic operation comprises a masked lookup operation.

Example 5 is the processing system of any of Examples 1-4, wherein the masked decrypted data is protected by one of: an arithmetic mask or a Boolean mask.

Example 6 is the processing system of any of Examples 1-5, further comprising: a first conversion unit circuit to convert a first masking scheme applied to the masked decrypted data to a second masking scheme; and a second conversion unit circuit to convert the second masking scheme applied the masked result to the fists masking scheme.

Example 7 is the processing system of any of Examples 1-6, further comprising: a cryptographic key manager to supply a cryptographic key for performing at least one of: the encryption operation or the decryption operation.

Example 8 is the processing system of any of Examples 1-7, further comprising: a random number generator to supply a cryptographic mask to the masked functional unit circuit for performing the masked arithmetic operation.

Example 9 is a system-on-chip (SoC), comprising: a first masked decryption unit circuit to perform a first masked decryption operation transforming first input data into first masked decrypted data; a second masked decryption unit circuit to perform a second masked decryption operation transforming second input data into second masked decrypted data; a masked functional unit circuit to produce a masked result by performing a masked arithmetic operation on the first masked decrypted data and the second masked decrypted data; and a masked encryption unit circuit to perform a masked encryption operation transforming the masked result into an encrypted result.

Example 10 is the SoC of Example 9, wherein the masked arithmetic operation comprises at least one of: a masked addition operation or a masked multiplication operation.

Example 11 is the SoC of any of Examples 9-10, wherein the masked arithmetic operation comprises a masked comparison operation.

Example 12 is the SoC of any of Examples 9-11, wherein the masked arithmetic operation comprises a masked lookup operation.

Example 13 is the SoC of any of Examples 9-12, wherein the masked decrypted data is protected by one of: an arithmetic mask or a Boolean mask.

Example 14 is the SoC of any of Examples 9-13, further comprising: a cryptographic key manager to supply a cryptographic key for performing at least one of: the encryption operation or the decryption operation.

Example 15 is the SoC of Example 9-14, further comprising: a random number generator to supply a cryptographic mask to the masked functional unit circuit for performing the masked arithmetic operation.

Example 16 is a method, comprising: receiving, by a private processing pipeline, input data; performing, by a masked decryption unit circuit of the private processing pipeline, a masked decryption operation transforming input data into masked decrypted data; performing, by a masked functional unit circuit of the private processing pipeline, a masked arithmetic operation on the masked decrypted data to produce a masked result; performing, by a masked encryption unit circuit of the private processing pipeline, a masked encryption operation transforming the masked result into an encrypted result; and outputting the encrypted result.

Example 17 is the method of Example 16, wherein the masked arithmetic operation comprises at least one of: a masked addition operation or a masked multiplication operation.

Example 18 is the method of any of Examples 16-17, wherein the masked arithmetic operation comprises a masked comparison operation.

Example 19 is the method of any of Examples 16-18, wherein the masked arithmetic operation comprises a masked lookup operation.

Example 20 is the method of any of Examples 16-19, wherein the masked decrypted data is protected by one of: an arithmetic mask or a Boolean mask.

Example 21 is the method of any of Examples 16-20, further comprising: transforming, by a first conversion unit circuit, a masking scheme applied to the masked decrypted data; and transforming, by a second conversion unit circuit, a masking scheme applied the masked result.

Example 22 is the method of any of Examples 16-21, further comprising: receiving, from a cryptographic key manager, a cryptographic key for performing at least one of: the encryption operation or the decryption operation.

Example 23 is the method of any of Examples 16-22, further comprising: receiving, from a random number generator, a cryptographic mask for performing the masked arithmetic operation.

Example 24 is a system comprising means to perform the method of any of the Examples 16-23.

Example 25 is an apparatus system comprising a processor configured to perform the method of any of the Examples 16-23.

Example 26 is a non-transitory machine readable storage medium comprising executable instructions which, when executed by a computing system comprising a private processing pipeline, cause the computing system to implement the method of any of Examples 16-23.

Example 27 is a non-transitory machine readable storage medium comprising executable instructions which, when executed by a private processing pipeline, cause the private processing pipeline to: receive input data; perform, by a masked decryption unit circuit of the private processing pipeline, a masked decryption operation transforming input data into masked decrypted data; perform, by a masked functional unit circuit of the private processing pipeline, a masked arithmetic operation on the masked decrypted data to produce a masked result; perform, by a masked encryption unit circuit of the private processing pipeline, a masked encryption operation transforming the masked result into an encrypted result; and output the encrypted result.

Example 28 is the non-transitory machine readable storage medium of Example 27, wherein the masked arithmetic operation comprises at least one of: a masked addition operation or a masked multiplication operation.

Example 29 is the non-transitory machine readable storage medium of any of Examples 27-28, wherein the masked arithmetic operation comprises a masked comparison operation.

Example 30 is the non-transitory machine readable storage medium of any of Examples 27-29, wherein the masked arithmetic operation comprises a masked lookup operation.

Example 31 is the non-transitory machine readable storage medium of any of Examples 27-30, wherein the masked decrypted data is protected by one of: an arithmetic mask or a Boolean mask.

Example 32 is the non-transitory machine readable storage medium of any of Examples 27-31, further comprising executable instructions which, when executed by the private processing pipeline, cause the private processing pipeline to: transforming, by a first conversion unit circuit, a masking scheme applied to the masked decrypted data; and transforming, by a second conversion unit circuit, a masking scheme applied the masked result.

Example 33 is the non-transitory machine readable storage medium of any of Examples 27-32, further comprising executable instructions which, when executed by the private processing pipeline, cause the private processing pipeline to: receiving, from a cryptographic key manager, a cryptographic key for performing at least one of: the encryption operation or the decryption operation.

Example 34 is the non-transitory machine readable storage medium of any of Examples 27-33, further comprising executable instructions which, when executed by the private processing pipeline, cause the private processing pipeline to: receiving, from a random number generator, a cryptographic mask for performing the masked arithmetic operation.

Various implementations may have different combinations of the structural features described above. For instance, all optional features of the processors and methods described above may also be implemented with respect to a system described herein and specifics in the examples may be used anywhere in one or more implementations.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:
1. A processing system, comprising:
  a cryptographic key manager to supply a cryptographic key;
  a random number generator to supply a first cryptographic mask and a second cryptographic mask;

a first masked decryption unit circuit to receive the first mask and a first encrypted input data and to perform a first masked decryption operation using the cryptographic key to transform the first encrypted input data into a first masked decrypted data;

a second masked decryption unit circuit to receive the second mask and a second encrypted input data and to perform a second masked decryption operation using the cryptographic key to transform the second encrypted input data into a second masked decrypted data;

a masked functional unit circuit to produce a masked result by performing a masked arithmetic operation using the first masked decrypted data and the second masked decrypted data as inputs; and a masked encryption unit circuit to receive a third mask and the masked result and to perform a masked encryption operation using the cryptographic key to transform the masked result into an encrypted result.

2. The processing system of claim 1, wherein the masked arithmetic operation comprises at least one of: a masked addition operation or a masked multiplication operation.

3. The processing system of claim 1, wherein the masked arithmetic operation comprises a masked comparison operation.

4. The processing system of claim 1, wherein the masked arithmetic operation comprises a masked lookup operation.

5. The processing system of claim 1, wherein the first masked decrypted data and the second masked decrypted data are protected by one of: an arithmetic mask or a Boolean mask.

6. The processing system of claim 1, further comprising:
a first conversion unit circuit to convert a first masking scheme applied to the first masked decrypted data and the second masked decrypted data to a second masking scheme; and
a second conversion unit circuit to convert the second masking scheme applied the masked result to the first masking scheme.

7. A system-on-chip (SoC), comprising:
a cryptographic key manager to supply a cryptographic key;
a random number generator to supply a first cryptographic mask and a second cryptographic mask;
a first masked decryption unit circuit to receive the first mask and a first encrypted input data and to perform a first masked decryption operation using the cryptographic key to transform the first encrypted input data into a first masked decrypted data;
a second masked decryption unit circuit to receive the second mask and a second encrypted input data and to perform a second masked decryption operation using the cryptographic key to transform the second encrypted input data into a second masked decrypted data;
a masked functional unit circuit to produce a masked result by performing a masked arithmetic operation using the first masked decrypted data and the second masked decrypted data as inputs; and
a masked encryption unit circuit to receive a third mask and the masked result and to perform a masked encryption operation using the cryptographic key to transform the masked result into an encrypted result.

8. The SoC of claim 7, wherein the masked arithmetic operation comprises at least one of: a masked addition operation or a masked multiplication operation.

9. The SoC of claim 7, wherein the masked arithmetic operation comprises a masked comparison operation.

10. The SoC of claim 7, wherein the masked arithmetic operation comprises a masked lookup operation.

11. The SoC of claim 7, wherein the first masked decrypted data and the second masked decrypted data are protected by one of: an arithmetic mask or a Boolean mask.

12. A method, comprising:
receiving, by a private processing pipeline, a cryptographic key from a cryptographic key manager, a first cryptographic mask and a second cryptographic mask from a random number generator, a first encrypted input data, and a second encrypted input data;
performing, by a first masked decryption unit circuit of the private processing pipeline, a first masked decryption operation using the first mask and the cryptographic key to transform the first encrypted input data into a first masked decrypted data;
performing, by a second masked decryption unit circuit of the private processing pipeline, a second masked decryption operation using the second mask and the cryptographic key to transform the second encrypted input data into a second masked decrypted data;
performing, by a masked functional unit circuit of the private processing pipeline, a masked arithmetic operation using the first masked decrypted data and the second masked decrypted data as inputs to produce a masked result;
performing, by a masked encryption unit circuit of the private processing pipeline, a masked encryption operation using a third mask and the cryptographic key to transform the masked result into an encrypted result; and
outputting the encrypted result.

13. The method of claim 12, wherein the masked arithmetic operation comprises at least one of: a masked addition operation or a masked multiplication operation.

14. The method of claim 12, wherein the masked arithmetic operation comprises a masked comparison operation.

15. The method of claim 12, wherein the masked arithmetic operation comprises a masked lookup operation.

16. The method of claim 12, wherein the first masked decrypted data and the second masked decrypted data are protected by one of: an arithmetic mask or a Boolean mask.

* * * * *